Dec. 26, 1967 J. K. DUNN 3,360,269

MINIATURIZED PHONOGRAPH

Filed Aug. 25, 1964 4 Sheets-Sheet 1

INVENTOR.
JOHN K. DUNN
BY
Fryer & Tjensvold
ATTORNEYS

MINIATURIZED PHONOGRAPH

Filed Aug. 25, 1964 4 Sheets-Sheet 2

INVENTOR.
JOHN K. DUNN

BY

Fryer & Tjensvold

ATTORNEYS

Dec. 26, 1967 J. K. DUNN 3,360,269

MINIATURIZED PHONOGRAPH

Filed Aug. 25, 1964 4 Sheets-Sheet 3

INVENTOR
JOHN K. DUNN
BY Fryer & Tjensvold
ATTORNEYS

INVENTOR.
JOHN K. DUNN

1

3,360,269
MINIATURIZED PHONOGRAPH

John K. Dunn, Livermore, Calif., assignor, by mesne assignments, of eighty-five percent to John K. Dunn, Berkeley, Calif., and fifteen percent to Morton J. Fried, Livermore, Calif.

Filed Aug. 25, 1964, Ser. No. 391,999
8 Claims. (Cl. 274—9)

This application is a continuation-in-part application of application Ser. No. 363,488, filed Apr. 29, 1964.

The present invention relates to phonographs and radio-phonographs and more particularly to new and novel apparatus for reproducing sound from records.

Phonographs (sound reproducing machines using records) which are presently commercially available all include the following basic elements: a flat, horizontal, rotatable surface, referred to as a turntable, which is normally powered by a motor to rotate at a desired constant speed for the purpose of rotating a record disposed on the turntable; a transducer which includes a needle which rides in a record groove and which operates to transduce characteristic markings on the record into electrical signals; an arm which carries the transducer on its free end and which is pivotally mounted at its other end whereby the transducer is held stationary relative to the rotating record but is free to move radially inwardly toward the center of the record in order that the needle may properly ride in the spiral groove of the record; an amplifier for increasing the magnitude of the electrical signal generated by the transducer; and a speaker for transducing the amplified electrical signal into sound waves. Each of the basic components mentioned above represents a complete art in itself and the patent files are replete with various devices and methods relating to each of the aforementioned basic components. While the present invention teaches certain improvements in several of the basic components which are part of a phonograph, it more importantly teaches an entirely new and novel approach to the fundamental problem of reproducing sound from characteristic markings on a record.

Presently available record players are confined to systems wherein everything is designed to remain stationary while a record rotates; the present invention teaches an advantageous phonograph system which rotates while a record remains stationary.

Since the development of solid state devices such as transistors, electronically controlled mechanisms have become increasingly smaller. At the present time the limiting factor in the size of most electronically controlled mechanisms, such as radios and television sets, is something other than the electronic components. In the past, the size of a radio was, for the most part, determined by the size of the capacitors and tubes which were employed to receive electrical signals and condition them to drive a speaker; today the size of a radio need not be much larger than the speaker itself. Where an electronically controlled mechanism is comprised of electronic components and mechanical components, it often occurs that the electronic components occupy very little space but the overall size of the device is nonetheless rather large due to the mechanical components. When this occurs, efforts are generally made to develop new or superior mechanical components which are also small in size so that the entire mechanism can enjoy the same reduction in size (miniaturization) as the electronic components. When all of the components of a device can be significantly reduced in size, the device is often made portable, where such results are desirable.

A popular device which has not been successfully miniaturized to the same extent as similar electronic devices, such as the radio, is the phonograph. The reason for the failure of phonographs to be fully miniaturized can be

2 found from an examination of the standard approach to reproducing sound from records and the necessary geometry which flows therefrom. As pointed out above, those phonographs presently in the market place include means for rotating a record and a means for holding a transducer stationary relative to the record. One dimension of such a device must be at least as great as the radius of the record being played. This follows since a portion of the device must support the record at its center while some other portion of the device must support the transducer holding arm at some location which is at a greater radial distance from the center of the record than the edge of the record itself. While the radius of a record represents a minimum dimension of available record players, it does not represent the practical size which has in fact been commercially realized.

While the radius of a 45 r.p.m. record is not very great and a phonograph having no greater dimension would indeed by considered miniature, and thus truly portable, the operation of such a device, using known techniques would be of a necessarily low quality, bordering on inoperability.

The reason for this result can be found in an examination of the forces which a needle experiences as it is guided through a record groove. The characteristic markings of a record which give rise to sound generally take the form of "wiggles," or radial variations in the path of the groove (most records made by modern techniques have radial variations rather than vertical variations). These irregularities in the groove act against the needle and set up drag forces. When the needle encounters a portion of record groove having a high density of irregularities, the magnitude of the drag force created can actually slow down the record and thus distort the output. The most effective way of combating this problem is by adding to the inertia of the rotating record so that the drag forces will not materially affect the speed of rotation of the record. Thus, turntables weighing thirty pounds or more are not uncommon in the art.

As the turntable of a phonograph record player becomes smaller and lighter it adds less inertia to the record and thus acts less to assist the record to rotate at a constant speed. Thus, a miniature phonograph record player employing known techniques would of necessity have a turntable so small as to provide no significant additional inertia to the record itself. Very light records would slow down each time high needle drag occurred resulting in a sound reproduction of very poor quality, at best. To counteract this it would be necessary to employ a high torque drive motor, which would be necessarily large and heavy.

By abandoning the conventional approach to reproducing sound from records, wherein the record turns and the rest of the equipment stays stationary, and by overcoming disadvantages of prior art rotating systems which have prevented them from being practical devices, the present invention provides a device for playing records which is in fact miniature. The present invention is also effective in counteracting needle drag in spite of its miniature size. The phonograph record player as taught by the present invention is for the most part not much larger than the speaker employed to produce sound waves. Accordingly, it is possible by the present invention to realize high quality sound reproduction from a record with a device no larger than a pocket size transistor radio.

Accordingly, it is an object of the present invention to provide apparatus for reproducing sound from a record wherein the record remains stationary at all times.

Another object of the present invention is to provide a device for reproducing sound from a record wherein a speaker, amplifier, arm, and cartridge are mounted for rotation relative to a stationary record.

A further object of the present invention is to provide a miniaturized phonograph record player including a radio receiver which is for the most part no larger in size than the radio receiver itself.

Further objects of the present invention include providing a novel arm assembly for a rotating phonograph, and a novel repeat system for a rotating phonograph.

Still another object of the present invention is to teach apparatus whereby a small transistor radio can be converted into a device for reproducing sound from a record.

Further and more specific objects and advantages of the invention are made apparent in the following specification wherein a preferred form of the invention is described by reference to the accompanying drawings.

In the drawings:

FIG. 1 is a plan view of the present invention shown in conjunction with a record with which it is operatively disposed wherein certain portions are broken away to more clearly reveal structural features of the invention;

FIG. 1*a* is a side elevation of a portion of the arm assembly of the present invention;

FIG. 2 is a side elevation of the present invention shown with respect to a record wherein certain portions are broken away, certain portions are shown in section and certain portions are not shown;

FIG. 2*a* is an enlarged view of an alternate locating means;

Figure 1:
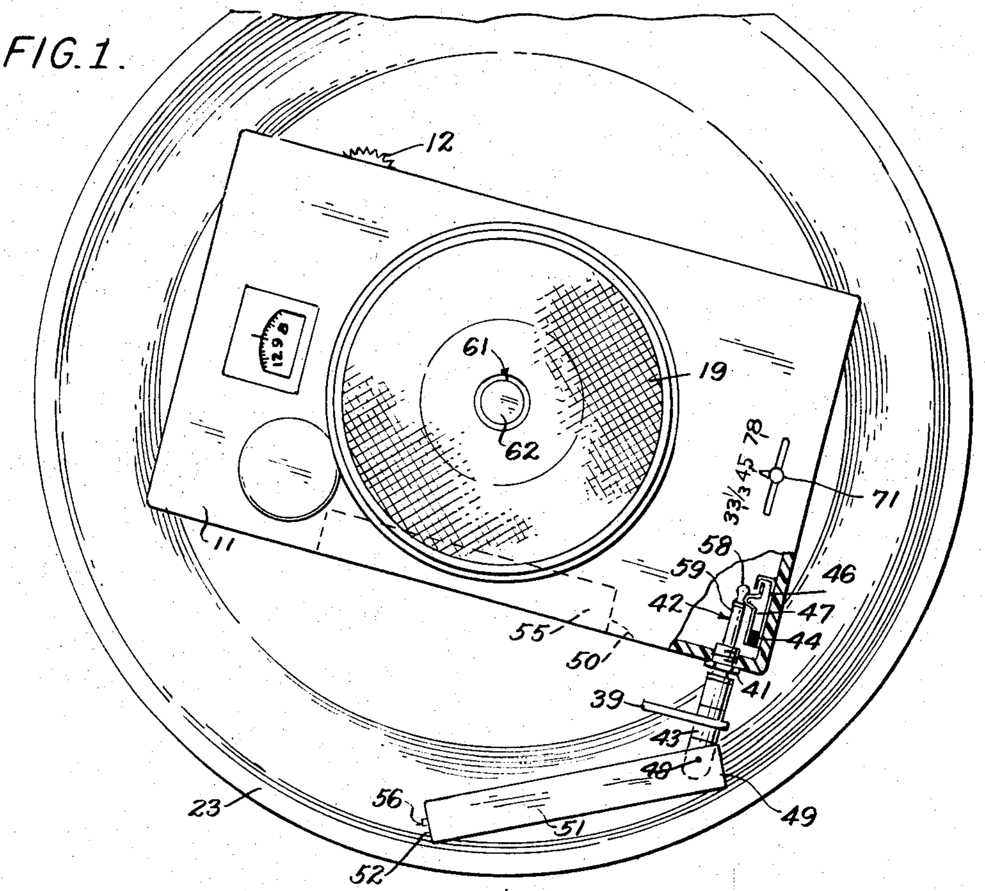
Figures 1A, 2, 2A:
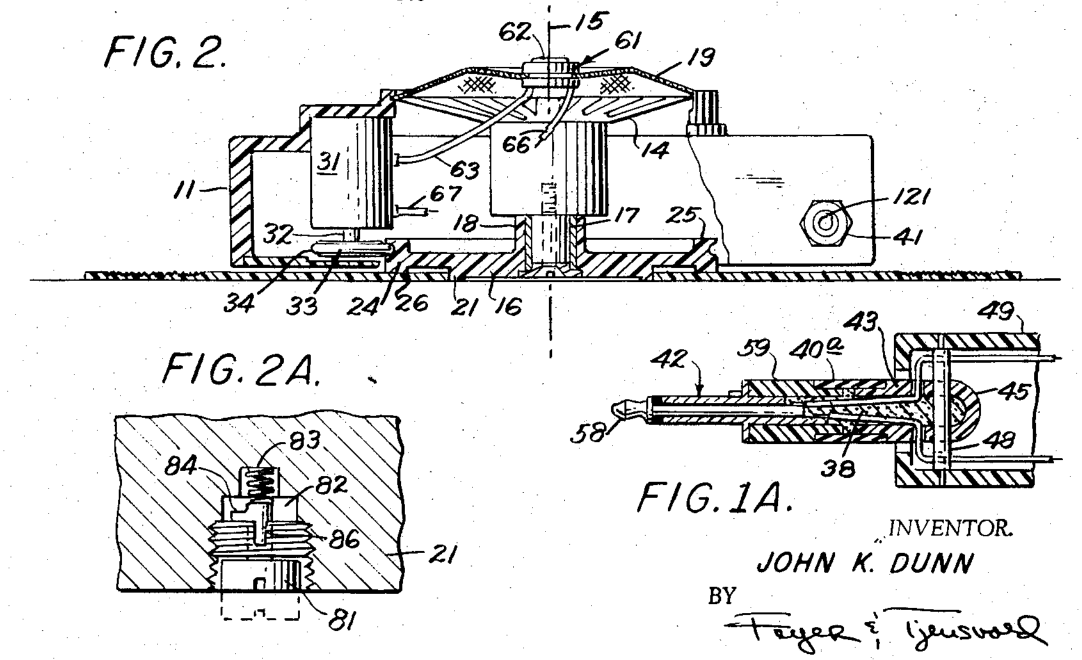
Figures 3, 4, 9, 10:
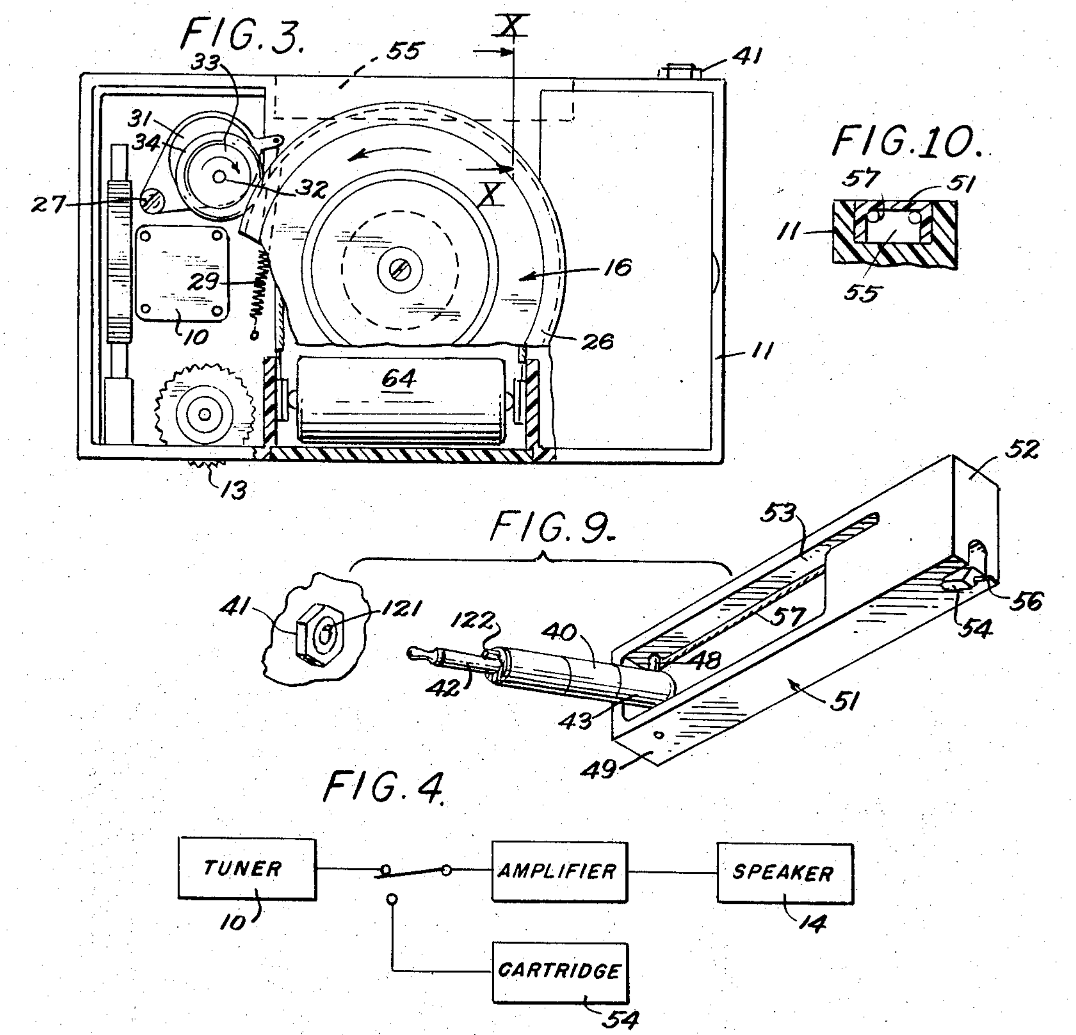
FIG. 3 is a bottom plan view of the invention with portions broken away to more clearly reveal the details of the invention.
FIG. 4 is a block diagram illustrating the electrical relationship of the several electronic components of the present invention.
FIG. 9 is an isometric illustration of the arm assembly of the present invention.
FIG. 10 is a view taken through line X—X of FIG. 3 illustrating the manner in which the arm assembly is stored when not in use.

Referring now to FIGS. 1, 2, and 3, a housing 11 encloses the standard components of a transistorized radio; a tuner circuit 10 controlled by a station selection knob 12; an amplifier circuit controlled by a volume control knob 13 (which knob also acts to control an on-off switch); and a speaker 14. The housing 11 with all of the components disposed therein is rotatably mounted on a generally circular pedestal 16. A bearing 17 is disposed between the pedestal shaft 18 and the speaker housing (which in turn is fixedly secured to the housing) to form a rotatable connection between the housing and pedestal.

The pedestal 16 includes a lower circular portion 21 having a diameter approximately equal to the diameter of the central hole 22 in a record 23. This provides means for centrally locating the pedestal 16 with respect to the record 23.

A mid-portion 24 of pedestal 16 has a larger diameter than the lower or locating portion 21 so as to form an annular surface 26 which engages the upper surface of record 23 when the locating portion 21 is inserted into hole 22. The diameter of central portion 24 of pedestal 16 is sufficiently larger than the diameter of locating portion 21 to insure that the pedestal provides a stable support for the housing.

The pedestal 16 also includes an upper circular portion 25 having a generally vertical circumferential surface 28 which is designed to frictionally engage a drive member, and thus may advantageously be somewhat concave.

An alternate locating member 81 (FIG. 2*a*) is releasably secured in a compartment 82 formed at the center of the bottom surface of pedestal portion 21. A spring 83 urges member 81 downwardly while a stop 84 prevents the member from protruding below the lower surface of portion 21. When member 81 is rotated to align stop 84 with slot 86, the member moves downwardly until the bottom of the slot is encountered. When stop 84 rests on the bottom of slot 86 the member 81 extends below portion 21 and the center of records having small central holes (33⅓ and 78 r.p.m. records generally) can be located. The lower surface of portion 21 then becomes the support surface. When records with large central holes (e.g., 45 records) are played, the member 81 is locked out of the way within compartment 82.

Together with the components normally found in a radio, housing 11 contains a motor 31 having a drive shaft 32. Fixedly secured at the end of shaft 32 is a drive wheel 33 the circumference 34 of which is preferably formed from a material having a high coefficient of friction, such as rubber.

Motor 31 is pivotally mounted within housing 11 at connection point 27, which disposes the circumference of drive wheel 33 in a position to engage the drive surface 28 of the upper portion 25 of pedestal 16. A spring 29 is secured at one end to motor 31 and at its other end to a point fixed relative to the housing. The spring urges the motor to pivot in the direction of pedestal 16 and thereby insures a firm driving connection between the drive wheel 33 and the pedestal. The ratio of internal motor gears (not shown), the size of wheel 33, the circumference of upper portion 27 of pedestal 16, and the voltage applied to motor 31 are all factors determining the speed at which the housing 11 rotates.

A connection jack 41 is disposed on one side of housing 11 and is designed to receive an electrical connector plug 42 (see also FIG. 1*a*) which is secured to a tone arm support member 43 by a resilient connector 40 formed by a piece of tubing **40*a* one end of which tightly surrounds a portion of electrical connector 42 while the other end tightly surrounds a portion of support member 43. Associated with jack 41 is a switch 44 having a tuner circuit associated member 46 and an amplifier associated member 47. Switch 44 is employed for the purpose of disconnecting the tuner circuit from the amplifier circuit when the plug 42 is inserted into the jack 41. When plug 42 is not disposed in jack 41, switch 44 is closed and member 46 contacts member 47 forming a connection between the tuner circuit and the amplifier circuit whereby the radio signals received by the tuner circuit are amplified and directed to the speaker. When plug 42 is inserted into jack 41, however, the end of the plug contacts the amplifier associated member 47 and urges it out of contact with the tuner associated member 46** whereby the electrical connection between the tuner and amplifier is broken preventing radio signals from reaching the amplifier circuit.

The end 45 of arm support member 43 includes a vertically disposed bore which receives a vertical pivot pin 48 which extends therethrough. The ends of pin 48 are secured in the end 49 of a tone arm 51 (see FIG. 9 also). The tone arm 51 is thereby hingedly supported and movable about a generally vertical axis which enables its free end 52 to be moved in an arc. The free end 52 of arm 51 carries a pick-up cartridge 54 including a needle 56 which is operative to sense characteristic markings on a record.

The tone arm 51 is generally rectangular in geometry and includes an open compartment 53 which is accessible from one side of the arm; the other side of the arm being a generally flat continuous surface. The ends of pivot pin 48 are located within the compartment 53 whereby one end of support member 43 is pivotally located within the compartment. When the arm is not in use, the portion of the arm assembly comprised of plug 42, connector 40 and support member 43 can be advantageously stored within the arm compartment 53, and the entire arm assembly can then be placed within housing compartment 55, as shown in FIG. 10. Thus by forming one generally flat surface of housing 11 to have a recessed compartment therein, the arm assembly can be carried by the housing, and when so stored operate to fill the recessed portion and form a generally continuous surface with the surrounding portion of the housing. A small cut-out 50 at one end of the recessed compartment 55 enables the arm to be easily snapped from its stored position when its use is desired.

The cartridge 54 is electrically connected to an electrical conductor 57 which passes through arm 51, through the support member 43 and through the resilient connector 40 to the plug 42. Plug 42, of conventional design, has a tip portion 58 electrically separate from the plug body 59 but in electrical communication with the end of the plug to which conductor 51 is attached. Thus, when the plug 42 is inserted into the jack 41, the tip 58 not only causes the switch 44 to open, but also forms an electrical connection between the cartridge 54 and the amplifier circuit.

The arm assembly comprised of plug 42, resilient connector 40, support member 43 and arm 51 is a unique combination of elements which gives rise to many advantages not previously enjoyed by prior art devices. A keyway 121 in jack 141 (see FIG. 9) receives a key 122 secured to electrical connector plug 42 when the plug is inserted with the jack. This keyway and key operate to locate the plug 42 in the jack 41 in a particular position relative to housing 11 and further, prevents axial rotation of the plug within the jack. The same result can be achieved using a square jack and plug or other equivalent non-rotating connectors. The particular relative position of plug 42 within jack 41 which is achieved is that which results in arm 51 being disposed at some angle below the generally horizontal position necessary for operation. Thus when the arm assembly is connected to housing 11 by plug 42, and the resilient connector 40 is not torsionally flexed, the arm 51 hangs in a downwardly direction. When the arm 51 is urged upwardly to a horizontal position for the needle to engage a record groove, the tube **40*a* is torsionally flexed causing the arm to experience a downward force in addition to that caused by the weight of the arm. By the particular arrangement of components, the force created in connector 40 is able to act on arm 51 through support member 43 and the vertical pivot pin 48**.

Thus the resilient connector 40 gives arm 51 a freedom of movement in a vertical plane (rotation about a horizontal axis) which is necessary for removing the needle 56 from a record without the necessity of removing the entire record player from the record. At the same time the connector provides an added downward force on the arm to insure proper needle engagement.

The particular arrangement whereby the arm is rotatable about a horizontal axis by virtue of a rotatable member between the housing 11 and the support member 43 and rotatable about a vertical axis by virtue of the connection between the arm and support member has two very important advantages over any other arrangement which might enable the arm to be similarly movable. If instead of the resilient connection 40, the plug 42 were integrally connected to support member 43, and the plug 42 were rotatable within jack 41 (the keyway eliminated), it would be possible to increase the downward force on arm 51 by extending a weight 39 (see FIG. 1) from support member 43 which would tend to rotate the support member and thus create a downward force on arm 51. The significant advantage of the particular arrangement taught herein is that the weight added to member 43 in no way increases the weight of arm 51 and thus no increase in centrifugal force acting to urge the arm radially outwardly is created. In this manner the arm 51 can be made exceptionally light to reduce forces acting to prevent the arm from following the path of the inwardly spiraling groove and still experience enough downward force to engage the record groove with the requisite force.

The other advantage which accrues to the arrangement which places the vertical pivot at a remote location from the housing 11, as opposed to a position on the housing, comes from the desirability of having the arm form as small an angle as possible with the groove in which the needle resides. Stated in another way, it is advantageous to have the angle of attack of the needle as close to tangential to the groove as possible. If the arm pivots about a fixed pivot point, then the above conditions are best satisfied by having that pivot point approximately midway between the innermost and outermost record groove (midway on the recording band).

If the vertical pivot point is on the housing, the housing will of necessity have to have one dimension no smaller than the distance between the center of the record and the mid-point of the record band. No such limitation exists on the arrangement of the present invention wherein the vertical pivot point is remote from the housing.

Figure 11:
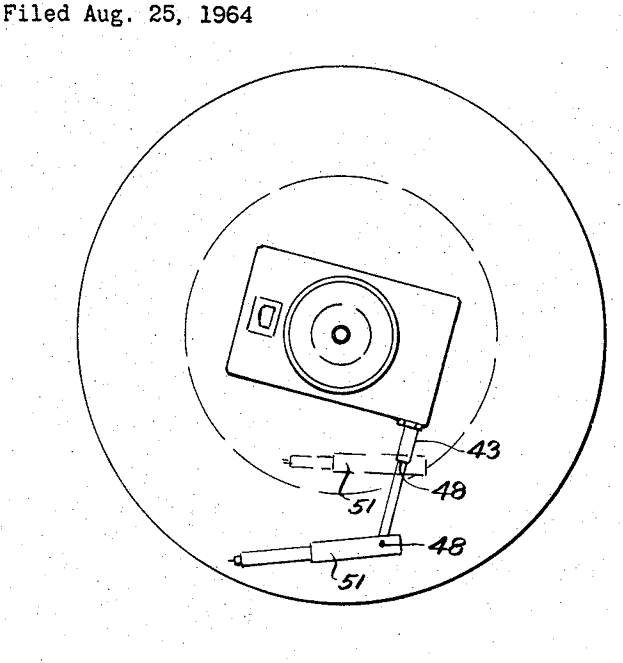
FIG. 11 is a semi-schematic plan view of the invention illustrating the adjustments necessary to accommodate records of different size.

Further, if records of various size recording bands are to be played by the same phonograph, it is necessary for best results to adjust the position of the vertical pivot pin 48 so that it is at the mid portion thereof at all times (see FIG. 11). Thus by making a support member 43 and arm 51 both of which are of adjustable length, it becomes possible to play records of different sizes without sacrificing quality for all but one size of record.

The tubing **40*a* which serves to join plug 42 and support member 43, performs an important function in addition to that of acting as a torsion spring as described above. The portion of plug 42 in one end of tube 40*a* and the portion of member 43 in the other end of tube 40*a* are not themselves in physical contact as a space 38, preferably filled with a damping substance, exists therebetween within the tube. The flexible tube 40*a* serves to prevent low frequency vibrations of the housing (as caused by the movement of the speaker in creating audio signals) from being transferred to the arm 51 and needle 56 and thus prevents low frequency feedback. The damping substance in the tube 40*a* acts to prevent high frequency feedback. Thus the resilient connector 40** serves as both a force producing member and a feedback filter.

FIG. 4 illustrates in block diagram form the electrical consequences of inserting the plug 42 into the jack 41. The radio tuner circuit 10 and the cartridge 54 provide alternate sources of electrical signals to the radio amplifier circuit which drives the speaker 14. When the cartridge 54 is inserted into the housing 11 by inserting plug 42 into jack 41 the tuner is automatically disconnected from the amplifier while the cartridge 54 is connected to the amplifier. In this way radio signals are prevented from reaching the amplifier while the signals generated by the cartridge 54 are amplified and transduced into sound waves by the speaker 14. When the cartridge 54 is disconnected from the housing 14 by withdrawing the plug 42 from the jack 41, the tuner circuit is placed back into communication with the amplifier circuit and the radio can be operated in its normal manner.

The necessity for switch 44 does not exist, of course, where the invention is not embodied in a device which is both a radio and a phonograph. When it is only desired to provide a device for playing records, the jack and plug simply serve to form electrical connection between the cartridge and amplifier without having to disconnect a tuner.

Located on the axis of rotation 15 of housing 11 (see FIGS. 2 and 5) between speaker grill 19 and speaker 14 is a switch 61 which includes an actuator button 62, which extends upwardly through the grill. The switch 61 includes a pair of electrical contacts (not shown) which can be electrically connected or electrically disconnected as a result of operation of the actuator 62. Such switches are well known in the art and are available in a wide variety of designs. For the present invention it is advantageous for the actuator 62 to be rotatable with respect to the remainder of the switch 61. The reason for this will be explained when operation of the switch is described. One of the two switch contacts is electrically connected to a conductor 63 which leads to motor 31, while the other contact of the switch is connected by a conductor 66 to one end of a battery 64. A conductor 67 connected between motor 31 and battery 64 completes a circuit which includes switch 61, battery 64 and motor 31. While the battery is only shown schematically in FIG. 5 and not included in FIG. 2, it should be understood that the battery is disposed within housing 11 and rotates therewith.

The battery 64 is the source of energizing voltage for motor 31 and is effective to induce operation thereof when the switch 61 is closed. Since it is necessary to drive motor 31 at a constant speed, it may be necessary to add a Zener diode to the motor circuit in order to give a well controlled voltage supply. The use of Zener diodes for this purpose is well known in the art and well within the skill of competent technicians. The use of a Zener diode is not necessary, however, if a mercury battery or similar voltage source of constant output is employed.

Figure 5:
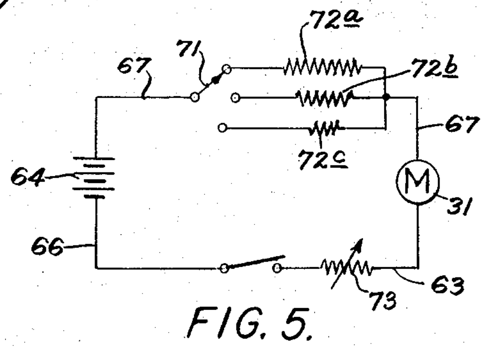
FIG. 5 is an electrical schematic diagram illustrating a speed control circuit.

Two advantageous additions to the motor battery circuit are illustrated in FIG. 5. A switch 71 is electrically associated with battery 64, motor 31, and resistors **72*a*, 72*b*, and 72*c* in a way which makes it possible to insert one of the resistors in series with the battery and motor. Switch 71 is a single pole three position switch and has a resistor connected at each one of the three switch positions. The resistors, in turn, are electrically connected to the motor 31. Since the speed of motor 31 is a function of the voltage which is placed across it, and further since the voltage which drops across motor 31 is dependent on the size of the resistor in series therewith, the speed of motor 31 can be controlled by selecting one of the resistors 72*a*, 72*b* or 72*c* to be in series with the motor and battery. If the resistors are selected to place a voltage across motor 31, which will give rise to motor speeds which turn the housing 31** at 33⅓, 45 and 78 r.p.m., all popular speed records can be played by the present invention.

A variable resistance trimmer resistor 73 placed in series with motor 31 offers an advantageous means for making fine adjustments to the phonograph playing speed which may be necessary from time to time to compensate for changes in component operation due to wear and time.

When it is desired to reproduce sound from record 23 with the present invention, the plug 42 is inserted into jack 41 and the locating portion 21 of pedestal 16 is inserted into the central opening 22 of record disc 23. The needle 56 at the end of arm 51 is located in a starting groove at the outer edge of record 23 and the volume is adjusted by means of control knob 13. With the pedestal and needle so disposed, the actuator 62 of switch 61 is operated placing voltage across the motor 31 resulting in energization of the motor and rotation of wheel 33. The frictional engagement of wheel 33 at its outer periphery 34 with the surface 28 of pedestal 16 causes the wheel to ride around the surface 28 at a constant speed, and in so doing urge the entire housing 11 to rotate at a constant speed. As housing 11 rotates (in a counter-clockwise direction as shown in FIG. 1) the arm 51 circles the record with the needle 56 riding the record groove. As the housing rotates the needle moves radially inwardly following the spiral path of the record groove, while the characteristic markings on the record are transduced by the cartridge 54, delivered to the amplifier circuit in housing 11 and transduced into sound waves by the speaker 14. When the record has been completely played, the actuator 62 is operated to remove the voltage from across motor 31 and thereby stop the rotation of housing 11.

The location of the actuator 62 on the axis of rotation of the housing 11 is most advantageous since that single spot on the housing 11 rotates but does not move while the housing rotates, thus making it easy to locate the actuator at all times.

It is desirable that actuator 62 be rotatable with respect to the rest of switch 61 and operate by rotation rather than an up and down movement. In this way the phonograph is stopped by simply placing a finger on actuator 62 and preventing its rotation with respect to the rest of switch 61, thus effectively rotating the actuator and disconnecting the battery and motor.

One of the outstanding features of the present invention is the manner in which the entire sound reproducing means acts to counteract needle drag. The present invention in providing a truly miniaturized and portable phonograph is of necessity incapable of including a turntable weighing twenty or thirty pounds or a motor capable of high-low speed torque. The present invention, however, does provide a device which employs virtually all of the mass available to it to add inertia to the rotating mechanism, and in so doing assures that operation will be satisfactory. This is realized in part by including the motor itself as part of the rotating mass which counteracts needle drag.

Figure 6:
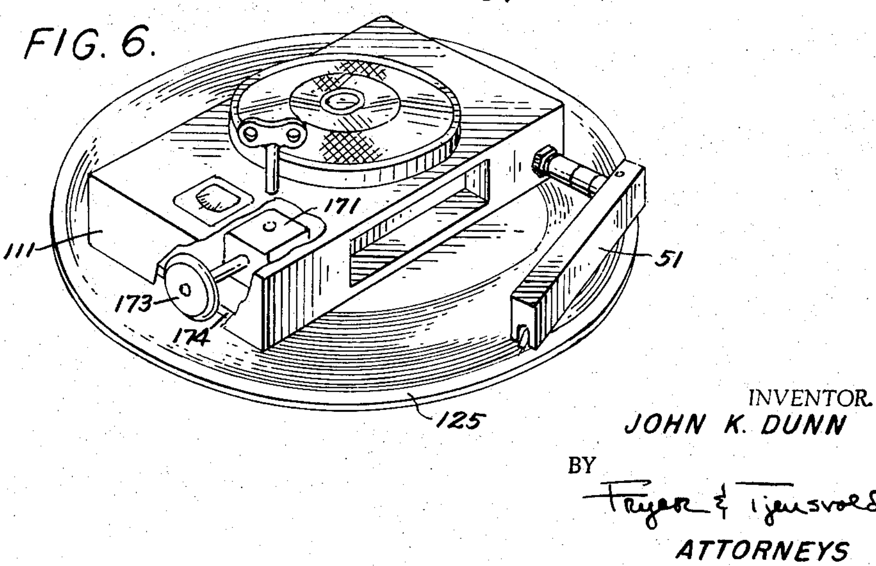
FIG. 6 is an isometric illustration of an alternate embodiment of the present invention wherein certain portions are broken away.

FIG. 6 illustrates an alternate embodiment of the present invention wherein a spring energized wind-up motor 171 serves as the source of power for rotating the housing 111. Spring energized wind-up motors are well known in the art, as are escapement mechanisms for maintaining the output of the wind-up motor constant. Accordingly, the details of motor 171 are not shown. The motor 171 operates to drive a generally horizontally disposed drive shaft 172 which has a drive wheel 173 secured at its end. A portion of the drive wheel 173 extends out of the bottom of housing 111 through a slot 174 and engages the surface of a record 125 with which it forms a driving connection. The wheel 173 could also be designed to engage the pedestal on which the housing is mounted. When the energy in motor 171 is released, wheel 173 is driven around the record 125 and housing 111 rotates. By enlarging the width of slot 174 and making the radial position of wheel 173 variable (either by making the whole motor assembly radially adjustable or making the length of shaft 172 adjustable), the speed of rotation of the housing can be easily varied without changing the motor's operating speed.

Figure 7:
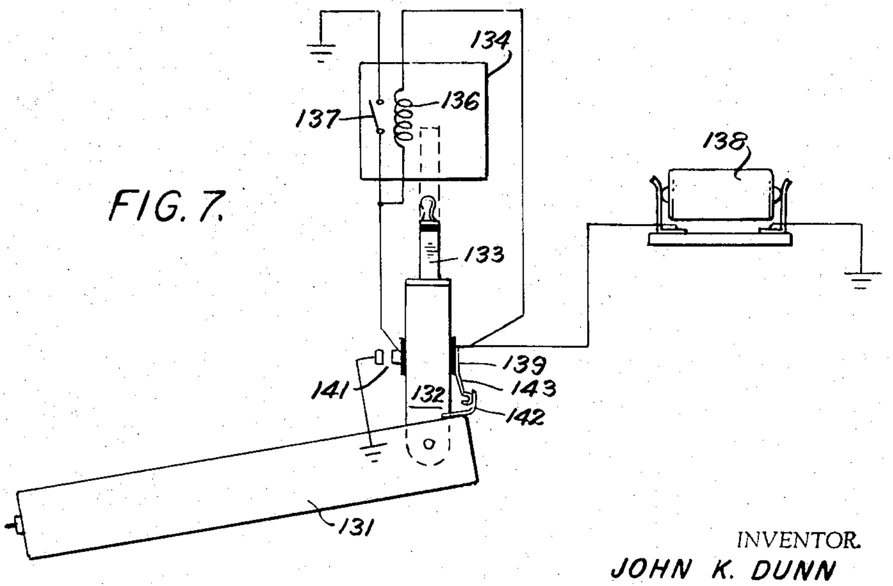
FIG. 7 is a semi-schematic illustration of an automatic repeat system of the invention.

FIG. 7 illustrates a repeat system for the present invention whereby a record can be played more than once without requiring that the needle be manually reset. A tone arm 131 is secured to a support member 132 which is connected at one end by a shaft 133 of a rotary solenoid 134. Solenoid 134 includes a coil 136 which when energized operates to rotate the shaft 133 through a prescribed angle. The solenoid 134 further includes a switch 137 which is normally open and which automatically closes upon energization of the coil 136. A source of electrical energy 138 is connected at one of its ends to ground and at its other end to a normally closed switch 139. Normally closed switch 139 is in turn electrically connected to one end of coil 136 which in turn is electrically connected to a normally opened switch 141 which leads to ground. Connected in electrical parallel with switch 141 is the normally open, solenoid operated switch 137 which acts as a latching switch as will be described.

In operation, the arm 131 moves gradually clockwise (as illustrated in FIG. 7) as a record is played until it reaches the end of the record at which time the angular position of arm 131 relative to member 132 results in switch 141 closing. When switch 141 closes, a complete electrical circuit from electrical source 138 through switch 139, through coil 136, and through switch 141 to ground is formed. The current which flows through this completed circuit energizes coil 136 which causes shaft 133 to rotate in a clockwise direction. When member 132 rotates the end of arm 131 is lifted from the record being played. The energization of coil 136 also results in switch 137 closing. When the end of arm 131 is raised from the record being played the centrifugal force acting against the rotating arm causes it to move in a counter-clockwise direction, toward the edge of the record. Immediately upon the arm 131 moving in a counter-clockwise direction the contacts of switch 141 separate. This does not de-energize coil 136, however, since the closed latching switch 137 provides an alternate path to ground whereby the coil 136 remains energized.

When the arm 131 achieves the angular position relative to member 132 which corresponds to the needle end of arm 131 being at the location of the starting groove, an actuator 142 secured to arm 131 engages a lever 143 which operates to open switch 139. When switch 139 is open, the source of electrical energy is disconnected from the coil 136 causing the solenoid to be de-energized. When the coil is de-energized, the switch 137 opens and the shaft 133 rotates to allow the end of arm 131 to contact the record to be played. As the arm moves in a clockwise direction once again the contacts of switch 139 close, placing the circuit in its initial condition.

Figure 8:
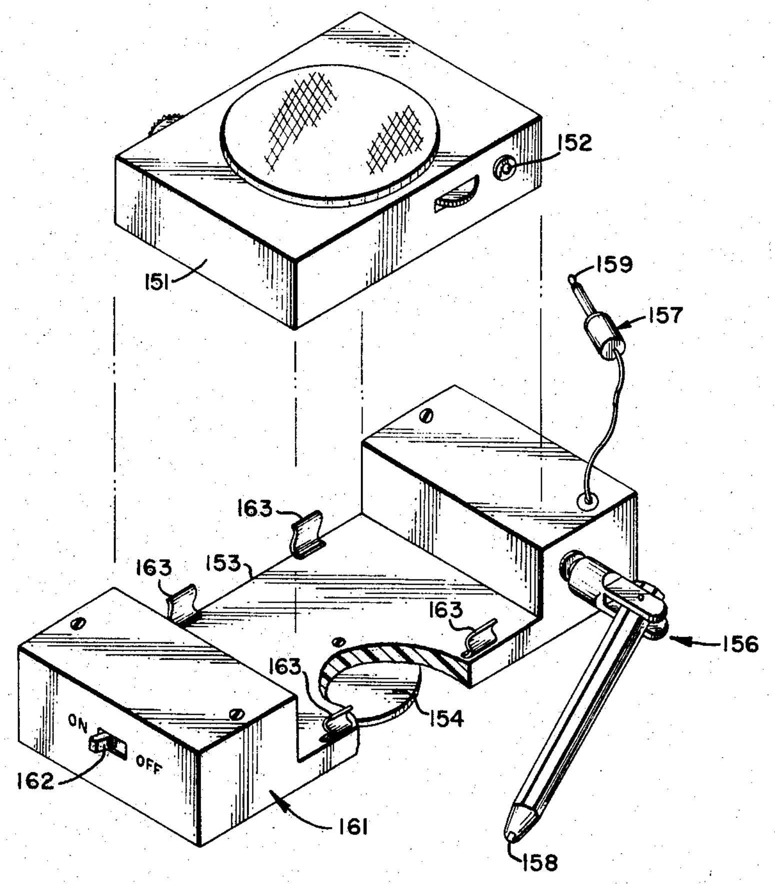
FIG. 8 is an isometric illustration of a radio-to-phonograph conversion system.

FIG. 8 illustrates an embodiment of the present invention wherein a housing 151 encloses a conventional transistor radio which is totally unmodified except for the presence of a jack 152 with an associated tuner separation switch (not shown) which functions in the same manner as the switch 44 illustrated and described with reference to FIG 1. A platform 153 is rotatably mounted on a pedestal 154 and supports a phonograph arm assembly 156 at one of its ends. The phonograph arm assembly is electrically connected to a plug 157 whereby electrical signals generated by the transducer 158 carried by the arm assembly are made available at the end 159 of plug 157. The other end of platform 153 includes an enclosed compartment 161 which houses a motor for turning pedestal 154, a battery for energizing the motor and an on-off switch 162 for controlling electrical energization of the motor. In operation, the radio is disposed on the platform 153 and releasably held there as by clips 163. The plug 157 is inserted into jack 152 whereby the electrical signals generated by the cartridge 158 are substituted for signals from the tuner of the radio circuit and are played through the radio speaker.

The embodiment of FIG. 8 has the advantage of providing a radio-phonograph combination which offers a radio unencumbered in any manner by necessary phonograph components when it is desired to use the radio alone.

In order for the phonograph of the present invention to function as a sound reproduction system which is in fact as pleasing to the listener as non-rotating devices, it is necessary for the axis of the speaker to be on the axis of rotation of the housing. If the speaker is off of the axis of rotation, there will be constant relative movement between the listener and the source of sound, which will give rise to noticeable volume changes and frequency shifts due to the Doppler effect.

Another feature taught by the present invention necessary to give rise to a device which is commercially acceptable, is an arrangement of components which eliminates the necessity of employing moving electrical connectors, such as brushes. Such connectors are a constant source of electrical noise and subject to frequent malfunction. With the arrangement of components set forth above, it is possible to energize the motor and amplifier from the same electrical source without employing rotating electrical contacts.

From the foregoing description it becomes clear that the present invention teaches a completely new method of reproducing sound from records. A record is disposed on a preferably horizontal flat surface which is relatively stationary. An entire phonograph system is rotatably mounted on a pedestal and disposed in the center of the record. By means of a motor, also mounted on the pedestal, the entire reproducing system is rotated while the record is maintained stationary. This method of reproducing sound from records does not require a mechanism having a record support portion and an arm support portion separated by at least the distance of the radius of a record. Thus, the requirement that the mechanism have one dimension at least as large as the radius of the record does not apply to the present invention. While the present invention has been shown as being somewhat larger than the radius of the record illustrated, there is nothing which demands this relative size and it should be clear that a much smaller device is possible.

I claim:

1. In combination with a grooved disc record, a phonograph comprising, in combination; a housing including an audio amplifier for amplifying electrical audio signals and a speaker to which the amplifier signals are fed, an arm assembly for a phonograph including a rotatable housing containing sound reproduction equipment comprising in combination;

an electrical connector non-rotatively secured to the housing coupled to said amplifier;

a support member;

a resilient connector joining said electrical connector and said support member in a manner which enables said support member to rotate about a horizontal axis relative to said electrical connector, said resilient connector comprising a piece of flexible resilient tubing with one end tightly surrounding a portion of said electrical connector and the other carrying said support member and urging the same downwardly; and a transducer arm with a record groove urging element on the outer end thereof which is urged by said flexible resilient tubing, acting through said support member and the transducer arms, downwardly upon the grooved record hingedly joined to said support member whereby said arm is movable about a vertical axis.

2. The combination of claim 1 wherein the ends of said tubing are fixedly secured to said support member and said electrical connector wherein axial rotation of said support member relative to said electrical connector causes torsion in said tubing.

3. The combination of claim 1 wherein the space in said tubing between said electrical connector and said support member is filled with a damping substance.

4. The combination of claim 3 wherein said damping material is operable to prevent high frequency vibrations in said electrical connector from being transmitted to said support member and arm.

5. In combination with a disc record having an annular grooved recording band, a phonograph comprising, in combination; a housing, means carried by said housing for producing audio sound waves from electrical signals which represent characteristic markings on said annular record band of the record, a transducer carrying arm connected to said housing and supported at one end for pivotable movement about a vertical pivot axis which enables the arm to move in a horizontal plane, a transducer on the other end of said transducer carrying arm for generating electrical signals fed to said first mentioned means from said characteristic markings on said record and which includes an extension which rides in the record grooves said vertical pivot axis for said transducer carrying arm being located approximately midway between the inner and outer limits of the annular recording band of said record, and means rotatably supporting said housing and said transducer carrying arm for rotation on said record where the transducer is moved along said annular recording band thereof and where the axis of rotation thereof is aligned with the center of said annular recording band.

6. A phonograph comprising, in combination: a housing, means carried by said housing for producing audio sound waves from electrical signals which represent characteristic markings on a grooved annular recording band of the record, a transducer carrying arm connected to said housing and supported at one end for pivotable movement about a vertical pivot axis which enables the arm to move in a horizontal plane, a transducer including a record groove engaging element on the other end of said transducer carrying arm for generating electrical signals fed to the first mentioned means from the characteristic shape of the grooves on said record, said vertical pivot axis for said transducer carrying arm being located approximately midway between the inner and outer limits of the annular recording band of said record, and means for supporting said transducer carrying arm to vary the spacing between the vertical pivot axis of said transducer carrying arm and said axis of rotation of said housing selectively to position the vertical pivot axis of said transducer carrying arm approximately midway between the inner and outer limits of variously sized annular recording bands of different sized records, and means for rotatably supporting said housing and said transducer carrying arm for rotation on said record where the transducer is moved along said annular recording band of the record and where the axis of rotation thereof is aligned with the center of said annular recording band.

7. The combination of claim 6 wherein there is provided means for adjusting the length of said transducer carrying arm.

8. A phonograph comprising: a housing including means for converting electrical signals to sound waves, means for supporting said housing upon a stationary record having annular recording bands, said last mentioned means including means for supporting the housing for rotation about a vertical axis concentric with the center of said annular recording band, motor means in said housing for rotating said housing about said vertical axis, switch means for controlling the motor means to selectively stop and start the rotation of said housing, said switch means including an actuator button centered on the axis of rotation of said housing, said actuator button being operable by rotation thereof about said axis of rotation of said housing between the motor starting and stopping positions, the rotation of said actuator button in a direction opposite to the direction of rotation of the housing operating to stop the motor means, whereby the mere placement of the user's finger upon the actuator button during rotation of said housing will stop the same without requiring a significant downward pressure thereon.

References Cited

UNITED STATES PATENTS

| | | | |
|---|---|---|---|
| 3,224,782 | 12/1965 | Isemura | 274—14 |
| 3,044,783 | 7/1962 | Doncaster | 274—23 |
| 3,181,870 | 5/1965 | Lasswell | 274—9 |

NORTON ANSHER, *Primary Examiner.*

CLIFFORD B. PRICE, JOSEPH F. PETERS, *Assistant Examiners.*